(12) United States Patent
Kubo et al.

(10) Patent No.: US 11,594,380 B2
(45) Date of Patent: Feb. 28, 2023

(54) ELECTROLYTIC CAPACITOR USING A SEALING MEMBER INCLUDING AN ELASTIC MEMBER

(71) Applicant: Panasonic Intellectual Property Management Co., Ltd., Osaka (JP)

(72) Inventors: Daisuke Kubo, Osaka (JP); Doyu Hachisu, Yamaguchi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 419 days.

(21) Appl. No.: 16/682,212

(22) Filed: Nov. 13, 2019

(65) Prior Publication Data
US 2020/0176195 A1 Jun. 4, 2020

(30) Foreign Application Priority Data
Nov. 30, 2018 (JP) .............................. JP2018-225164

(51) Int. Cl.
*H01G 9/10* (2006.01)
*H01G 9/028* (2006.01)
*C08L 23/22* (2006.01)

(52) U.S. Cl.
CPC ............ *H01G 9/10* (2013.01); *C08L 23/22* (2013.01); *H01G 9/028* (2013.01); *C08K 2201/005* (2013.01)

(58) Field of Classification Search
CPC .......................... H01G 9/10; H01G 9/028
See application file for complete search history.

(56) References Cited

U.S. PATENT DOCUMENTS

| 6,128,179 | A | 10/2000 | Morokuma | |
|---|---|---|---|---|
| 2005/0203236 | A1* | 9/2005 | Prowell | C08K 9/06 524/447 |
| 2007/0165362 | A1* | 7/2007 | Minato | H01G 9/145 361/518 |

(Continued)

FOREIGN PATENT DOCUMENTS

| CN | 102714100 A | | 10/2012 | |
|---|---|---|---|---|
| CN | 110272700 A | * | 9/2019 | ............... B01J 3/03 |

(Continued)

OTHER PUBLICATIONS

Buggy et al.; Polymer-filler interactions in kaolin/nylon 6,6 composites containing a silane coupling agent; Dec. 9, 2004, Composites Part A: Applied Science and Manufacturing; vol. 36, Issue 4, Apr. 2005, pp. 437-442 (Year: 2004).*

(Continued)

*Primary Examiner* — David M Sinclair
(74) *Attorney, Agent, or Firm* — McDermott Will & Emery LLP (57) ABSTRACT

An electrolytic capacitor includes a capacitor element, a case, and a sealing member. The case has an opening and houses the capacitor element. The sealing member seals the opening. The sealing member includes an elastic member that is fit in the opening. The elastic member includes a polymer component and a particle component. The polymer component includes at least butyl rubber. The particle component includes at least particles of kaolin. An average particle size of the particles of kaolin is less than or equal to 4 μm.

20 Claims, 2 Drawing Sheets

(56) References Cited

U.S. PATENT DOCUMENTS

| | | | | |
|---|---|---|---|---|
| 2009/0135547 A1* | 5/2009 | Nanba | ............... | H01G 11/52 |
| | | | | 361/502 |
| 2009/0268378 A1* | 10/2009 | Matsuura | ............ | H01G 9/02 |
| | | | | 29/25.03 |
| 2010/0104941 A1* | 4/2010 | Nakabayashi | .......... | H01G 9/10 |
| | | | | 361/519 |
| 2010/0232088 A1 | 9/2010 | Fujita et al. | | |
| 2012/0236469 A1* | 9/2012 | Takahara | ............. | H01G 9/10 |
| | | | | 361/518 |

FOREIGN PATENT DOCUMENTS

| | | | | | |
|---|---|---|---|---|---|
| JP | 05283302 | A | * | 10/1993 | |
| JP | 7-263287 | | | 10/1995 | |
| JP | 11-274011 | | | 10/1999 | |
| JP | 2001-031817 | A | | 2/2001 | |
| JP | 2008-024882 | | | 2/2008 | |
| JP | 2008-189816 | A | | 8/2008 | |
| JP | 2009021263 | A | * | 1/2009 | ............ C08K 3/346 |
| JP | 2011-207976 | | | 10/2011 | |
| JP | 2018-019048 | A | | 2/2018 | |
| KR | 20100123000 | A | * | 11/2010 | ............ C08K 3/346 |
| WO | 2008/136175 | | | 11/2008 | |

OTHER PUBLICATIONS

English Translation of Chinese Search Report dated Jul. 5, 2022 for the related Chinese Patent Application No. 201911146098.0.

* cited by examiner

ELECTROLYTIC CAPACITOR USING A SEALING MEMBER INCLUDING AN ELASTIC MEMBER

BACKGROUND

1. Technical Field

The present disclosure relates to an electrolytic capacitor using a sealing member including an elastic member.

2. Description of the Related Art

An electrolytic capacitor includes a capacitor element, a case that houses the capacitor element, and a sealing member that seals an opening of the case. The sealing member includes an elastic member that is fit in the opening of the case. And the elastic member is constituted by an elastic material such as rubber or a rubber-state polymer. The elastic member further includes an additive agent, such as, a filler, a vulcanizing agent, a reinforcing agent, or an antioxidant in some cases (see, Unexamined Japanese Patent Publication No. H11-274011 and International Patent Publication No. 2008/136175).

SUMMARY

An electrolytic capacitor according to one aspect of the present disclosure includes a capacitor element, a case, and a sealing member. The case has an opening and houses the capacitor element. The sealing member seals the opening. The sealing member has an elastic member that is fit in the opening. The elastic member includes a polymer component and a particle component. The polymer component includes at least butyl rubber. The particle component includes at least particles of kaolin. An average particle size of the particles of kaolin is less than or equal to 4 µm.

In the electrolytic capacitor having the above configuration, it is possible to prevent or reduce thermal degradation of the elastic member, and to prevent or reduce expansion of the elastic member during a reflow process.

DETAILED DESCRIPTION OF EMBODIMENT

When the electrolytic capacitor is used under a high temperature environment, the elastic member is thermally degraded significantly. It is difficult to sufficiently prevent or reduce thermal degradation of the conventional elastic member under a high temperature environment, and a crack is therefore generated in the elastic member in some cases. In order to suppress generation of cracks, it is effective to make hardness of the elastic member low. However, if the hardness of the elastic member becomes low, the elastic member is likely to expand during a reflow process.

The electrolytic capacitor is used under a high temperature environment such as in a vehicle engine room in some cases. The opening of the case that houses the capacitor element is sealed with the elastic member that is fit in the opening. However, since the elastic member is made of a polymer component such as butyl rubber, heat resistance is not sufficient, and thus the elastic member is oxidized and degraded under a high temperature environment. Specifically, under a high temperature environment, heat acts on the elastic member, and then radicals are generated from the polymer component constituting the elastic member (such as an organic polymer, for example, butyl rubber). And oxygen is added to the radicals, whereby the adducts further convert the organic polymer into radicals. The above reaction is repeated, and, in the mean time, the polymer chain of the organic polymer becomes shorter. Since the shortened organic polymer evaporates due to the heat, the elastic member becomes brittle.

When an antioxidant is added to the elastic member, the antioxidant supplies proton radicals. Hence, the organic polymer radicals are scavenged by the proton radicals, whereby the oxidation degradation can be suppressed. However, since the antioxidant evaporates under a high temperature environment, a sufficient radical scavenging effect cannot be exhibited.

Particularly, in a case of using elastic members containing butyl rubber, there is a limitation in an effect of suppressing thermal degradation by adding an antioxidant because butyl rubber is easily oxidized and degraded.

Further, in the electrolytic capacitor, an elastic member is fit into the opening of the case when an opening of a case that houses a capacitor element is sealed. Thus, a large stress is applied to the elastic member. When the elastic member is thermally degraded while a stress is applied to the elastic member, a crack is likely to be generated.

The elastic member includes a filler in some cases. When the elastic member containing butyl rubber contains a filler having a large average particle size, a crack is generated more easily than when the elastic member contains a filler having a small average particle size. The reason for this is as follows. When the elastic member is formed, a crosslink density of the butyl rubber cannot be easily increased due to a filler having a large average particle size. Hence, the polymer chain is likely to be shortened due to oxidation decomposition. Even in the case where a filler having a large average particle size is used, if a content amount of the filler is made small, the crosslink density can be increased, so that reduction in the crosslink density is suppressed to a certain extent. However, the elastic member is likely to expand during a reflow process because the content amount of the filler is small. Note that talc is known as a filler for the elastic member. However, in the case of using talc, it is found that there is a tradeoff relationship between suppression of crack and suppression of expansion of the elastic member during a reflow process, and thus it is difficult to suppress the both. In ordinary cases, if the content amount of the filler in the elastic member is large, hardness of the elastic member is increased, and expansion during a reflow process is suppressed. However, in the case of using talc, even if the content amount of talc in the elastic member is increased, the hardness of the elastic member cannot be sufficiently increased, and thus it is difficult to suppress the expansion during a reflow process.

An electrolytic capacitor according to one aspect of the present disclosure includes a capacitor element, a case, and a sealing member. The case has an opening and houses the capacitor element. And the sealing member seals the opening. The sealing member has an elastic member that is fit in the opening. The elastic member includes a polymer component and a particle component. The polymer component includes at least butyl rubber. The particle component includes at least particles of kaolin. An average particle size of the particles of kaolin is less than or equal to 4 μm.

By using the particles of kaolin having an average particle size less than or equal to 4 μm in the elastic member containing a polymer component containing at least butyl rubber, it is possible to increase a crosslink density of the polymer component containing the butyl rubber. Therefore, even if the polymer component is oxidized and degraded under a high temperature environment, the crosslink density can be secured to a certain extent. This can suppress thermal degradation of the elastic member. As a result, it is possible to suppress generation of cracks in the elastic member. Further, since kaolin is contained in the elastic member, it is also possible to suppress expansion of the elastic member during a reflow process. In particular, by using the particles of kaolin having a small average particle size, it is also possible to increase a filling amount of the particles of kaolin in the elastic member. Hence, it is possible to secure an effect of highly suppressing the expansion during a reflow process.

Hereinafter, the present disclosure will be more specifically described, based on an exemplary embodiment. However, the following exemplary embodiment does not limit the present disclosure.

Figure 1:
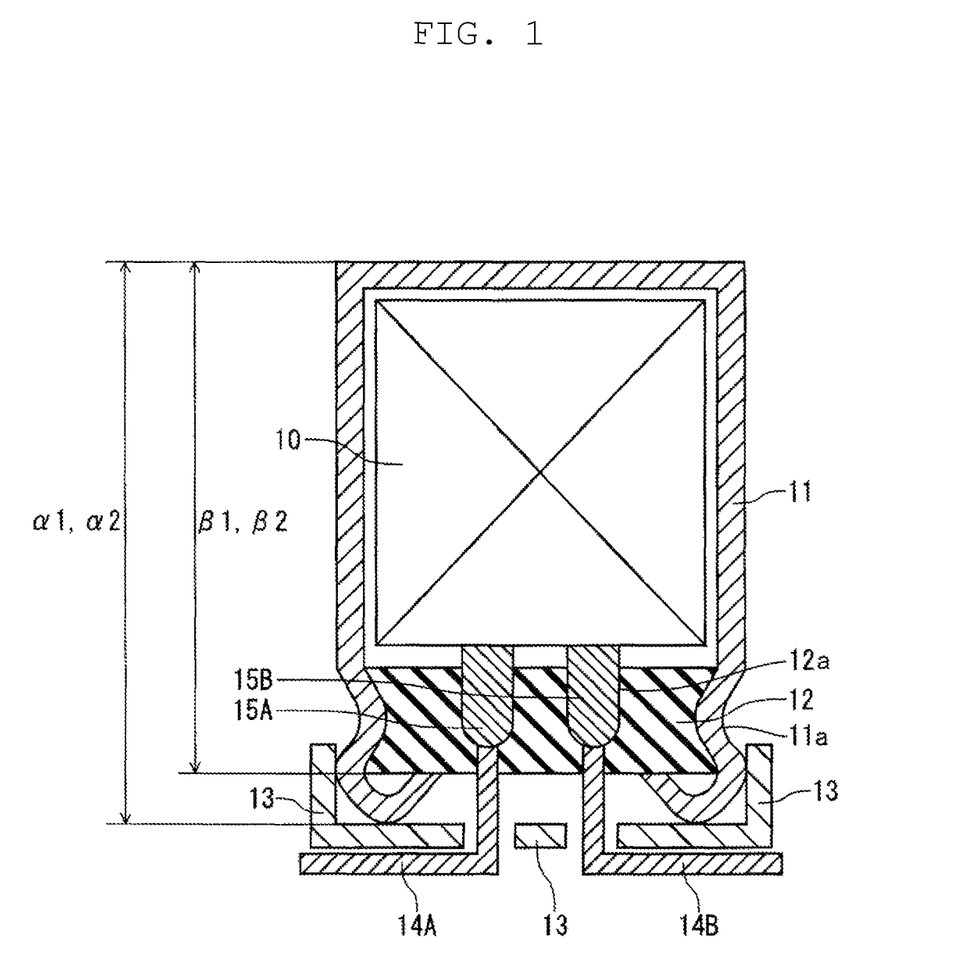
FIG. 1 is a cross-sectional schematic diagram illustrating an electrolytic capacitor according to an exemplary embodiment of the present disclosure.
Figure 2:
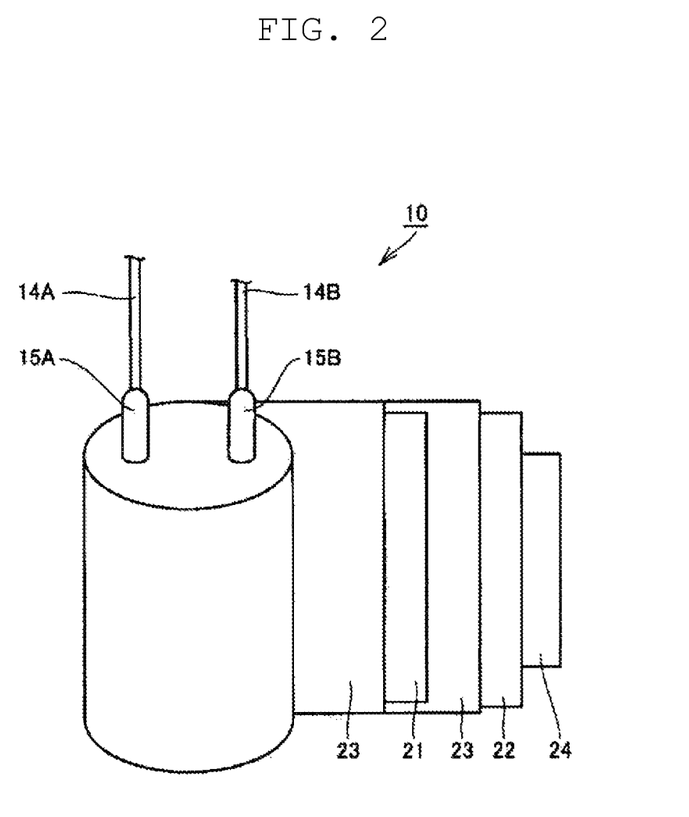
FIG. 2 is a schematic diagram for describing a configuration of a capacitor element according to the above exemplary embodiment.

FIG. 1 is a cross-sectional schematic diagram illustrating an electrolytic capacitor according to the present exemplary embodiment, and FIG. 2 is a schematic diagram in which a part of a capacitor element of the electrolytic capacitor is developed.

The electrolytic capacitor includes, for example, capacitor element 10, case 11 that houses capacitor element 10 and has a cylindrical shape, a sealing member that is constituted by elastic member 12 and seals an opening of case 11, seat plate 13 facing elastic member 12. The electrolytic capacitor further includes lead wires 14A and 14B that are led out via through holes 12a of elastic member 12 and penetrate through seat plate 13, and lead tabs 15A and 15B that connect the lead wires 14A and 14B to electrodes of capacitor element 10. A part of case 11 near an opening end is drawn inward, and the open end is curled to swage elastic member 12. Further, region 11a where a diameter of case 11 is reduced by drawing (specifically, lateral drawing) is formed at a part of case 11 facing a side wall of elastic member 12.

Capacitor element 10 includes a wound body as shown in FIG. 2. The wound body includes anode 21 connected to lead tab 15A, cathode 22 connected to lead tab 15B, and separator 23. The wound body shown in FIG. 2 is a half-finished product having no electrolyte.

Anode 21 and cathode 22 are wound with separator 23 disposed between anode 21 and cathode 22. An outermost periphery of the wound body is fixed with winding stop tape 24. FIG. 2 shows the wound body before the outermost periphery of the wound body is fixed, and in the drawing, the wound body is partially developed.

Anode 21 includes a metal foil whose surface is roughened to have projections and recesses, and an anodizing oxide film is formed on the metal foil having the projections and recesses. In capacitor element 10, a solid electrolyte is attached to at least a part of the surface of the anodizing oxide film. The solid electrolyte may coat at least a part of a surface of cathode 22 and/or at least a part of a surface of separator 23. The electrolytic capacitor is formed in the following manner: capacitor element 10 in which the solid electrolyte is formed is housed in case 11, and the opening of case 11 is sealed with the sealing member. When an electrolytic solution is used, the electrolytic solution is housed in case 11 together with capacitor element 10.

(Sealing Member)

The sealing member includes elastic member 12, and seals the opening of the case that houses capacitor element 10 by fitting elastic member 12 in the opening. Elastic member 12 includes a polymer component and a particle component. The particle component contains at least particles of kaolin, and an average particle size of the particles of the kaolin is less than or equal to 4 μm.

The polymer component contains at least butyl rubber (first polymer component), and may further contain a polymer component (second polymer component) other than the butyl rubber. As the polymer component, an insulating material is used. By using butyl rubber, it is possible to suppress permeation of gas and/or liquid through the elastic member. Hence, high sealability of elastic member 12 can be secured. Note that if ethylene-propylene rubber is used as the polymer component in the elastic member as described in Unexamined Japanese Patent Publication No. H11-274011, gas and liquid can easily permeate. Hence, electrical characteristics of the electrolytic capacitor may be deteriorated.

A proportion of the butyl rubber in elastic member 12 is, for example, greater than or equal to 10% by mass, and is preferably greater than or equal to 20% by mass. The proportion of the butyl rubber is, for example, less than or equal to 70% by mass, and is preferably less than or equal to 60% by mass.

These lower limits and upper limits can be arbitrarily combined. When the proportion of the butyl rubber is within the above range, it is possible to suppress permeation of gas and/or liquid, and thus to secure high sealability.

Examples of the second polymer component include isoprene rubber, silicone rubber, fluorine rubber, ethylene-propylene rubber, and chlorosulfonated polyethylene rubber (such as Hypalon™ rubber). As the second polymer component, one type of polymer may be used, or two or more types of polymers may be used in combination. The proportion of the second polymer component in the whole polymer component (the total mass of the first polymer component and the second polymer component) is, for example, less than 50% by mass, is preferably less than 30% by mass, and may be less than or equal to 10% by mass or less than or equal to 5% by mass.

As the kaolin, a silicate compound containing aluminum is used. Examples of general kaolin (kaolinite) include, without being limited thereto, triclinic system aqueous material represented by $Al_4Si_4O_{10}(OH)_8$. Further, the silicate compound may be an aqueous material or may be anhydride (for example, a calcined material). Anhydride (such as calcined kaolin) has a small particle size and does not contain water. Hence, when anhydride is used, it is easy to suppress thermal degradation of the elastic member, and the effect of suppressing generation of cracks is further enhanced.

When the average particle size of the particles of kaolin is less than or equal to 4 μm, thermal degradation can be suppressed, and thus generation of cracks can be suppressed. Further, expansion of the elastic member during a reflow process is suppressed. The average particle size of the particles of kaolin is, for example, greater than or equal to 1 μm. When the average particle size is greater than or equal to 1.5 μm, dispersibility of the particles in the elastic member is improved. Hence, the effect of suppressing thermal degradation is enhanced, and thus crack resistance is further improved. Further, it is also possible to secure high expansion resistance during a reflow process.

In the present specification, the average particle size recites 50% average particle size (D50) in a particle size distribution on a volume basis which is measured by a laser diffraction/scattering type particle size measurement device. Alternatively, the average particle size may be measured from an electron microscope photograph of the particles taken out from the elastic member 12. First, inorganic material particles in elastic member 12 are collected, for example, by resolving components other than the particles in a solvent or by heating to remove the components other than the particles. And then, in an electron microscope photograph of the collected particles, any one of the collected particles is chosen, and an area surrounded by an outer periphery of the chosen particle is measured. A diameter of a circle having the same area as the area surrounded by an outer periphery of the chosen particle is determined as the particle size. In a similar manner, the particle sizes of a plurality of particles (for example, 10 particles) that are arbitrarily chosen are measured. And the average particle size is obtained by averaging the particles sizes of the plurality of particles. When the elastic member 12 contains two or more types of particles, the particles of kaolin are distinguished from second particles by analyzing compositions of the particles by, for example, the energy dispersive X-ray analysis (EDX).

A content ratio of the kaolin in the elastic member is preferably greater than or equal to 70 parts by mass with respect to 100 parts by mass of the polymer component, and is further preferable greater than or equal to 100 parts by mass. If the content ratio of the kaolin is within the above range, it is possible to further improve the effect of suppressing the expansion during a reflow process. A content ratio of the kaolin with respect to the polymer component of 100 parts by mass is preferably less than or equal to 150 parts by mass, and is further preferably less than or equal to 120 parts by mass. If the content ratio of the kaolin is within the above range, it is possible to further improve the effect of suppressing the generation of cracks.

Elastic member 12 may contain, in addition to particles of kaolin (first particles), other fillers (second particles). Examples of materials for the second particles include talc, mica, silica, titania, and/or alumina. Also in the case where elastic member 12 contains the second particles, such an effect of the kaolin as described above can be exhibited depending on a content amount of the kaolin. When particles of talc is used as the second particles, cross-linking of butyl rubber is facilitated. Hence, the effect of suppressing thermal degradation of the polymer component is enhanced. Thus, cracks can be more effectively suppressed. Accordingly, it is preferable to use at least the particles of talc as the second particles.

A proportion of the second particles in the total amount of the particles of kaolin (first particles) and the second particles (such as particles of talc) is, for example, preferably less than or equal to 50% by mass, and is preferably less than 50% by mass. Further, the proportion of the second particles in the total amount of the particles of kaolin and the second particles is more preferably less than or equal to 40% by mass, and is particularly preferably less than or equal to 30% by mass. Meanwhile, it is also preferable that the proportion of the kaolin is the highest in the particle component. In the above cases, since the effect due to the kaolin more easily exhibits, it is possible to secure high crack resistance, and at the same time, to further enhance the effect of suppressing the expansion of elastic member 12 during a reflow process.

Since the above effect can be obtained by the kaolin alone, a lower limit of the proportion of the second particles is not particularly limited, but the proportion may be greater than or equal to 1% by mass, for example.

Elastic member 12 may contain, as necessary, an additive agent (for example, an antioxidant, a reinforcing agent such as carbon black, a cross-linking agent, a cross-linking promoter, a dispersion aid, a modifier, a vulcanizing agent, a vulcanization aid, and/or a processing aid). In particular, in the case where elastic member 12 contains an antioxidant, thermal degradation of elastic member 12 is further suppressed, so that crack resistance can be further improved.

As the antioxidant, a known antioxidant can be used. Examples of the antioxidant include a hindered phenol compound, a hindered amine compound, and a phosphorus-based antioxidant. As the antioxidant, one type of antioxidant may be used alone, or two or more types of antioxidants may be used in combination. From the viewpoint of securing higher crack resistance, it is preferable to use a hindered phenol compound.

In particular, a hindered phenol compound that has a first hindered group and a second hindered group at respective two substitution sites (a first substitution site and a second substitution site) adjacent to a phenolic hydroxy group in a phenol skeleton is preferable. Each of the first hindered group and the second hindered group has at least one tertiary carbon. And one of the tertiary carbons is bonded to one of the above two substitution sites, and becomes a quaternary carbon in the hindered phenol compound. Specifically, one of the tertiary carbons of each of the first hindered group and the second hindered group is directly bonded to each of the first substitution site and the second substitution site, respectively. The hindered phenol compound having such a structure has higher heat resistance than that of a hindered phenol compound in which a hydrogen atom, a primary carbon of a substituent, or a secondary carbon of a substituent is bonded to the first substitution site or the second substitution site. Hence, degradation of the hindered phenol compound is suppressed even at high temperatures (for example, 155° C.), whereby the mass does not change almost at all. Accordingly, the hindered phenol compound remains in the elastic member even under a high temperature environment, and exerts a radical scavenging function. Thus thermal degradation of the polymer component can be suppressed. Accordingly, generation of cracks can be suppressed even if elastic member 12 is exposed in a high temperature environment while a stress is applied to elastic member 12 by being pressed with the open end of the case or through a drawing operation of the case or the like.

Each of the first hindered group and the second hindered group is a substituent having large steric hindrance, and includes at least one tertiary carbon. Each of the first hindered group and the second hindered group may include two or more tertiary carbons. Examples of each hindered group include t-butyl group, 1, 1-dimethyl-propyl group, and mesityl group. In view of easy availability and a high effect of suppressing thermal degradation, a hindered phenol compound in which each of the first hindered group and the second hindered group is t-butyl group is preferable.

The hindered phenol compound contained in elastic member 12 can be identified by performing gas chromatography-mass spectrometry (GC-MS) on an extract obtained by extracting, with a solvent (such as acetone), elastic member 12 during heating (for example, at 80° C.) by using a Soxhlet extractor. Note that a compound having a relatively high molecular weight compound may be identified by liquid chromatograph mass spectrometry (LC-MS) instead of GC-MS.

A molecular weight of the hindered phenol compound ranges preferably from 300 to 3,000, inclusive, and more preferably from 400 to 2,000, inclusive, or from 450 to 1,500, inclusive. A hindered phenol compound having a molecular weight in the above range can be uniformly dispersed easily. In addition, a change in weight of the hindered phenol compound at high temperatures (for example, at 155° C.) can be small. Since the change in weight at high temperatures is small, the hindered phenol compound does not evaporate even if elastic member 12 is exposed in a high temperature environment. Hence, the hindered phenol compound exerts an anti-oxidization effect so that the effect of suppressing thermal degradation of elastic member 12 can be further improved.

Note that the molecular weight can be measured by GC-MS or LC-MS. Note that a compound having a relatively high molecular weight may have an average molecular weight (weight-average molecular weight) within the above molecular weight range.

If the hindered phenol compound easily generates proton radicals, an effect of scavenging the radicals generated from the polymer component containing butyl rubber is accordingly enhanced. The more stable are the phenol radicals generated due to the proton radicals being pulled out from the hindered phenol compound, the more easily the proton radicals are generated.

In this case, the effect of suppressing thermal degradation of the polymer component can be enhanced. From these points of view, a phenol radical formation reaction heat of the hindered phenol compound is preferably less than or equal to 82 kcal/mol (≈343 kJ/mol), and is more preferably less than or equal to 81 kcal/mol (≈339 kJ/mol) or less than or equal to 80 kcal/mol (≈335 kJ/mol).

Note that the phenol radical formation reaction heat ($H_r$) of the hindered phenol compound is calculated by the following equation.

$$H_r(\text{kcal/mol}) = E_r - (E_0 + E_p)$$

where $E_r$ is energy of the hindered phenol compound in a radical state;

$E_0$ is energy of the hindered phenol compound in a state before becoming radicals; and $E_p$ is energy of the proton radicals.

The energies $E_r$, $E_0$, and $E_p$ are each obtained by a density-functional approach. For calculation of a density functional, is used the initio molecular orbital calculation method calculation program Gaussian09, Revision E.01 produced by Gaussian, Inc. As the density functional, is used B3LYP density functional (A. D. Becke, J. Chem. Phys. 98 (1993) 5648; C. Lee, W. Yang, R. G. Parr, Phys. Rev. B 37 (1988) 785) proposed by Becke, Lee, Yang, and Parr. As a basis function, is used 6-31G* basis function (R. Ditchfield, W. J. Hehre, and J. A. Pople, J. Chem. Phys. 54 (1971) 724). Note that as the energy of radicals in an open-shell state, a value obtained by a restricted open-shell method is used.

Stabilization energy is calculated by converting the unit Ha of each energy into kcal/mol.

Examples of the hindered phenol compound include Pentaerythritol tetrakis[3-(3,5-di-tert-butyl-4-hydroxyphenyl) propionate], Stearyl 3-(3,5-Di-tert-butyl-4-hydroxyphenyl) propionate, 2,4,6-tris(3',5'-di-tert-butyl-4'-hydroxybenzyl) mesitylene, 1,3,5-tris[[3,5-bis(1,1-dimethylethyl)-4-hydroxyphenyl]methyl]-1,3,5-triazine-2,4,6(1H,3H,5H)-trione, and 2,2'-thiodiethyl-bis[3-(3,5-di-tert-butyl-4-hydroxyphenyl)propionate].

As the hindered phenol compound, one type of a hindered phenol compound may be used alone, or two or more types of hindered phenol compounds may be used in combination.

The content ratio of the antioxidant (such as a hindered phenol compound) contained in elastic member 12 ranges preferably from 0.5 parts by mass to 6.0 parts by mass, inclusive, with respect to 100 parts by mass of polymer component, and is more preferably from 0.5 parts by mass to 4.0 parts by mass, inclusive. If the content ratio of the antioxidant is within the above range, the radical scavenging effect by the antioxidant exhibits more easily, and the effect of suppressing thermal degradation of elastic member 12 can therefore be further improved. In addition, it is easy to maintain moderate hardness, and it is therefore possible to suppress expansion of elastic member 12 during a reflow process and to suppress inhibition of vulcanization when elastic member 12 is formed.

Elastic member 12 has a shape corresponding to a shape of the opening of case 11 (for example, a disc shape such as a circular plate shape). The opening of case 11 is sealed such that the open end is curled and the open end is directly or indirectly pressed against elastic member 12.

Elastic member 12 is formed to close the opening of case 11, but normally has through holes 12a through which leads constituted by lead wires 14A and 14B and lead tabs 15A and 15B pass through in order to take out a current from capacitor element 10. It is necessary to configure such that there is no gap between the leads and elastic member 12 in parts around through holes 12a. Hence, peripheries of through holes 12a of elastic member 12 are pressed by the leads and therefore receive stresses. Therefore, in general, an elastic member having such through holes easily get cracked under a high temperature environment. In the present exemplary embodiment, since the thermal degradation of the polymer component is suppressed by making elastic member 12 contain particles of kaolin having the above average particle size, it is possible to suppress generation of cracks even in the case where elastic member 12 has through holes 12a.

The sealing member may be constituted only by elastic member 12, and may include other members in addition to elastic member 12. For example, the elastic member may include a resin layer formed on an outer surface of the elastic member. In this case, the sealing member includes the elastic member and the resin layer.

(Case 11)

Examples of material for case 11, which houses capacitor element 10, include metal such as aluminum, stainless steel, copper, iron, and brass, and an alloy of these metals. After capacitor element 10 is housed in case 11, the opening of case 11 is sealed with the sealing member. Case 11 has a tubular shape such as a cylindrical shape and may have a bottom part like the example shown in the drawing. When a bottomed case is used for case 11, it is enough to seal one opening with a sealing member. Alternatively, when both end parts of a tubular-shaped case (in other words, both end parts in a length direction or in an axis direction of a tubular shape) are open, both openings at the both end parts may be sealed with sealing members, respectively.

After capacitor element 10 is housed in case 11 and elastic member 12 of the sealing member is fit into the opening of case 11, a diameter of a part of case 11 is reduced so that case 11 is pressed against the side wall of elastic member 12. Due to this reduction of the diameter, the sealing member is fixed, and airtightness between elastic member 12 and the side wall of case 11 can be improved. The reduction of the diameter is performed in such a manner that drawing (specifically, lateral drawing) of on case 11 having a tubular shape is performed, from outside, to a part facing the side wall of elastic member 12. The reduction of the diameter causes a stress apply to elastic member 12. When elastic member 12 is exposed to a high temperature environment while the stress is applied, elastic member 12 is thermally degraded significantly. In the present exemplary embodiment, even in the case where a stress tends to be applied to elastic member 12 as described above, thermal degradation of the polymer component is suppressed because elastic member 12 contains particles of kaolin having the above average particle size. Hence, generation of cracks in elastic member 12 can be suppressed.

When a diameter of case 11 at a part where elastic member 12 is fit in is reduced with respect to the side wall of elastic member 12, the outer diameter of case 11 in this diameter-reduced region 11a becomes smaller than in the other region of case 11. The region where the outer diameter of case 11 is smaller than the other region, which corresponds to the side wall of elastic member 12, is defined as a diameter-reduced region.

(Capacitor Element 10)

Capacitor element 10 includes an anode having a dielectric layer (anodizing oxide film), a cathode, a separator disposed between the anode and the cathode, and an electrolyte in contact with the dielectric layer.

(Anode)

Examples of the anode include a metal foil whose surface is roughened and a metal sintered compact. Although a type of metal constituting the anode is not particularly limited, it is preferable to use a valve metal such as aluminum, tantalum, niobium, or titanium or an alloy containing a valve metal from the viewpoint of easiness in forming the dielectric layer.

A metal foil surface can be roughened by a known method. By roughening, a plurality of projections and recesses are formed on a surface of the metal foil. The roughening is preferably performed by, for example, etching the metal foil. The etching may be performed by, for example, a DC electrolytic method or an AC electrolytic method.

(Dielectric Layer)

The dielectric layer is formed on a surface of the anode. More specifically, since the dielectric layer is formed on the roughened surface of the metal foil, the dielectric layer is formed along inner wall surfaces of holes or recesses (pits) in the surface of the anode.

Although a method of forming the dielectric layer is not particularly limited, the dielectric layer can be formed by an anodizing treatment of the anode. The anodizing treatment may be performed by, for example, immersing the metal foil in an anodizing solution such as an ammonium adipate solution. In the anodizing treatment, a voltage may be applied to the metal foil immersed in the anodizing solution, as needed.

In general, from the viewpoint of mass productivity, the roughening and the anodizing treatment are performed on a metal foil formed of a large-sized valve metal or the like. In this case, an anode on which a dielectric layer is formed is prepared by cutting the processed foil in a desired size.

(Cathode)

As the cathode, a metal foil is used, for example. Although a type of metal is not particularly limited, it is preferable to use a valve metal such as aluminum, tantalum, or niobium or an alloy containing a valve metal. On the cathode, roughening and/or anodizing treatment may be performed, as needed. The roughening and the anodizing treatment can be performed, for example, by the above method described considering the anode.

(Separator)

The separator is not particularly limited. For example, it is possible to use a nonwoven fabric containing a fiber material such as cellulose, polyethylene terephthalate, vinylon, or polyamide (for example, aliphatic polyamide or aromatic polyamide such as aramid).

The capacitor element can be manufactured by a known method. For example, the capacitor element may be prepared by stacking the cathode and the anode on which the dielectric layer is formed with the separator interposed between the anode and the cathode, and then forming the conductive polymer layer between the anode and the cathode. The capacitor element may also be prepared by winding the cathode and the anode on which the dielectric layer is formed with the separator interposed between the anode and the cathode to form the wound body as shown in FIG. 2, and then forming the conductive polymer layer between the anode and the cathode. When the wound body is formed, lead wires 14A and 14B may be formed upright on the wound body as shown in FIG. 2 by winding the anode and cathode around lead tabs 15A and 15B.

An end part of an outer surface of one of the anode, the cathode, and the separator (cathode 22 in FIG. 2), which is positioned at the outermost of the wound body is fixed with a winding stop tape. Note that in the case where the anode was prepared by cutting a large-sized metal foil, an anodizing treatment for the capacitor element in a form of the wound body or the like may further be performed so as to provide the dielectric layer on a cutting surface of the anode. As the electrolyte, an electrolytic solution or a solid electrolyte can be used, or both of the solid electrolyte and the electrolytic solution may be used.

The solid electrolyte contains, for example, a manganese compound and a conductive polymer. As the conductive polymer, it is possible to use, for example, polypyrrole, polythiophene, polyaniline, or derivatives of them. The solid electrolyte containing the conductive polymer can be formed by, for example, chemical polymerization and/or electrolytic polymerization of a raw material monomer on the dielectric layer. Alternatively, the solid electrolyte can be formed by applying, to the dielectric layer, a solution in which the conductive polymer is dissolved or a dispersion liquid in which the conductive polymer is dispersed.

The electrolytic solution may be a non-aqueous solvent or a mixture of a non-aqueous solvent and an ionic material (a solute, for example, an organic salt) dissolved in the non-aqueous solvent. The non-aqueous solvent may be an organic solvent or an ionic liquid. As the non-aqueous solvent, it is possible to use, for example, ethylene glycol, propylene glycol, sulfolane, γ-butyrolactone, N-methylacetamide, or the like. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

Elastic member 12 has a shape corresponding to a shape of the opening of case 11 (for example, a disc shape such as a circular plate shape). The opening of case 11 is sealed such that the open end is curled and the open end is directly or indirectly pressed against elastic member 12.

Elastic member 12 is formed to close the opening of case 11 but normally has through holes 12a through which leads constituted by lead wires 14A and 14B and lead tabs 15A and 15B pass through in order to take out a current from capacitor element 10. It is necessary to configure such that there is no gap between the leads and elastic member 12 in parts around through holes 12a. Hence, peripheries of through holes 12a of elastic member 12 are pressed by the leads and therefore receive stresses. Therefore, in general, an elastic member having such through holes tends to get cracked under a high temperature environment. In the present exemplary embodiment, since the thermal degradation of the polymer component is suppressed by making elastic member 12 contain a hindered phenol compound as described above, it is possible to suppress generation of cracks even in the case where elastic member 12 has through holes 12a.

The sealing member may be constituted only by elastic member 12, and may include other members in addition to elastic member 12. For example, the elastic member may include a resin layer formed on an outer surface of the elastic member. In this case, the sealing member includes the elastic member and the resin layer.

EXAMPLES

Hereinafter, the present disclosure is specifically described with reference to examples and comparative examples; however, the present disclosure is not limited to the examples below.

<<Samples A1 to A4 and B1 to B4>>

In the present samples, wound type electrolytic capacitors (diameter of 10 mm×length of 10 mm) with a rated voltage of 35 V and a rated capacitance of 270 µF were prepared. Hereinafter, a specific method for manufacturing an electrolytic capacitor will described.

(Preparation of Capacitor Element)

A dielectric layer was formed by performing an anodizing treatment on an Al foil, which has a roughened surface by using an ammonium adipate solution. The obtained anode was cut in a predetermined size. A wound body was prepared in a following manner: a lead tab was connected to each of Al foils, which is used as an anode or a cathode; the anode and the cathode were wound with a separator interposed between the anode and the cathode; and an outer surface was fixed with a winding stop tape. In this process, the anode and the cathode were wound around the lead tabs such that the lead tabs and lead wires integrated into the lead tabs were led out from the wound body. The anodizing treatment was performed again on the wound body by using the ammonium adipate solution.

The wound body was immersed for 5 minutes in a conductive polymer dispersion that was contained in a predetermined container. The conductive polymer dispersion contained polyethylene dioxythiophene, polystyrene sulfonic acid, and water. Thereafter, the wound body was taken out from the conductive polymer dispersion. The wound body impregnated with the polymer dispersion was dried for 20 minutes in a 150° C. drying furnace, so that the conductive polymer was attached between the anode and the cathode of the wound body. The capacitor element was completed in this manner. The capacitor element was housed in a bottomed cylindrical case having a diameter of 10 mm and a length of 10 mm.

(Impregnation with Electrolytic Solution)

An electrolytic solution was poured into the case and impregnated into the capacitor element in a reduced-pressure atmosphere (40 kPa) for 5 minutes. The electrolytic solution was prepared by resolving phthalic acid and triethylamine in a solvent containing γ-butyrolactone and ethylene glycol.

(Sealing of Capacitor Element)

Lead tabs 15A and 15B drawn out from capacitor element 10 were made to pass through holes 12a of the sealing member, which is made of elastic member 12, as shown in FIG. 1. And lead wires 14A and 14B respectively integrated with lead tabs 15A and 15B were led outside elastic member 12. In this state, elastic member 12 was fit into an opening of case 11, and fixed by lateral drawing. By curling the opening end part of case 11, capacitor element 10 is sealed with the sealing member constituted by elastic member 12.

As elastic member 12, a mixed body was prepared by kneading butyl polymer, a hindered phenol compound, particles shown in Table 1, a cross-linking agent, and an additive agent. The mixed body was molded by vulcanization molding in a circular plate shape having through holes 12a by using a molding die to complete elastic member 12. As the additive agent, a reinforcing agent (carbon black), a cross-linking promoter, a dispersion aid (stearin acid), and a modifier (silane coupling agent) were used. Note that a content ratio of the components in elastic member 12 were, with respect to 100 parts by mass of butyl rubber as the polymer component, 1 part by mass of a hindered phenol compound and 100 parts by mass of the particle component. As the hindered phenol compound, pentaerythritol tetrakis [3-(3',5'-di-tert-butyl-4'-hydroxyphenyl)propionate] ($H_r$=76.8 kcal/mol (≈321.3 kJ/mol), molecular weight 1178) was used.

<<Evaluation>>

(Thermal Degradation (Crack Resistance))

Thermal degradation of the elastic members were evaluated in the following procedure.

After sample electrolytic capacitors were left under an environment of 165° C. for 500 hours, lengths of cracks of the elastic members were measured. The crack length was obtained by measuring a straight-line distance between both end parts of the longest crack observed on the surface exposed outside from case 11 of each elastic member 12. Conditions of the generated cracks were evaluated under the following standard on the basis of magnitudes of the crack lengths.

OK: the crack length is less than or equal to 0.2 mm.

GD: the crack length is greater than 0.2 mm and less than or equal to 0.7 mm.

NG: the crack length is greater than 0.7 mm.

(Expansion Resistance During Reflow Process)

For each sample, 10 electrolytic capacitors were prepared. Then, the lengths of α1 and β1 in FIG. 1 were measured for each electrolytic capacitor with a micro gauge. After that, the electrolytic capacitors were left in a state heated to 200° C. for 5 minutes, and the lengths of α2 and β2 in FIG. 1 after the heating were measured. Then, expansion amounts of the sealing members were calculated by the following equation.

$$\text{Expansion amount(mm)} = (\beta 2 - \beta 1) - (\alpha 2 - \alpha 1)$$

The average value of the 10 expansion amounts was calculated, and the expansion resistance was evaluated under the following standard.

OK: the expansion amount is less than or equal to 0.2 mm.

GD: the expansion amount is greater than 0.2 mm and less than or equal to 0.3 mm.

NG: the expansion amount is greater than 0.3 mm.

The results are shown in Table 1.

TABLE 1

| | Particle | | Crack resistance | Expansion resistance |
|---|---|---|---|---|
| | Type | Average particle size | | |
| A4 | Calcined kaolin | 1.0 | GD | OK |
| A1 | | 1.5 | OK | OK |
| A2 | | 2.5 | OK | OK |
| A3 | | 4.0 | OK | OK |
| B1 | Calcined kaolin | 4.5 | NG | GD |
| B2 | Talc | 20.0 | OK | NG |
| B3 | Silica | 2.5 | GD | NG |
| B4 | Mica | 3.0 | NG | NG |

<<Samples A5 to A7>>

The content ratio of particles (calcined kaolin) with respect to 100 parts by mass of butyl rubber was changed as shown in Table 2. The elastic members and the electrolytic capacitors were manufactured in the same manner as the sample A1 except for the above change, and were evaluated.

The results of the samples A5 to A7 are shown in Table 2. Table 2 additionally shows also the result of the sample A1.

TABLE 2

| | Amount of calcined kaolin (parts by mass) | Crack resistance | Expansion resistance |
|---|---|---|---|
| A5 | 70 | OK | GD |
| A1 | 100 | OK | OK |
| A6 | 120 | OK | OK |
| A7 | 150 | GD | OK |

<<Samples A8 to A10>>

As the particles, particles of calcined kaolin and particles of talc (D50: 20.0 μm) were used at mass ratios shown in Table 3. The elastic members and the electrolytic capacitors were manufactured in the same manner as the sample A1 except for the above change, and were evaluated.

The results of the samples A8 to A10 are shown in Table 3. Table 3 additionally shows also the results of the samples A1 and B2.

TABLE 3

| | Particle | Ratio by weight | Crack resistance | Expansion resistance |
|---|---|---|---|---|
| A1 | Calcined kaolin:Talc | 100:0 | OK | OK |
| A8 | | 90:10 | OK | OK |
| A9 | | 70:30 | OK | OK |
| A10 | | 50:50 | OK | GD |
| B2 | | 0:100 | OK | NG |

<<Samples A11 to A15>>

The elastic members and the electrolytic capacitors were manufactured in the same manner as the sample A1 except for the fact that the content ratio of hindered phenol compound (antioxidant) with respect to 100 parts by mass of butyl rubber was changed as shown in Table 4, and evaluation was performed.

The results of the samples A11 to A15 are shown in Table 4. Table 4 additionally shows also the result of the sample A1.

TABLE 4

| | Antioxidant (parts by mass) | Crack resistance | Expansion resistance |
|---|---|---|---|
| A11 | 0.3 | GD | OK |
| A12 | 0.5 | OK | OK |
| A1 | 1.0 | OK | OK |
| A13 | 3.0 | OK | OK |
| A14 | 6.0 | OK | OK |
| A15 | 7.0 | OK | GD |

In the electrolytic capacitor according to the present disclosure, it is possible to suppress thermal degradation of the elastic member constituting the sealing member for the opening of the case, and at the same time, it is possible to suppress expansion of the elastic member during a reflow process. Thus, the electrolytic capacitor is appropriate for use at high temperature environment (for example, temperatures higher than 100° C. or 150° C.), such as, for example, use in a vehicle engine room.

What is claimed is:

1. An electrolytic capacitor comprising:
   a capacitor element;
   a case that houses the capacitor element, the case having an opening; and
   a sealing member that seals the opening, wherein:
   the sealing member includes an elastic member that is fit in the opening,
   the elastic member includes a polymer component and a particle component,
   the polymer component contains at least butyl rubber,
   the particle component includes at least particles of kaolin,
   an average particle size of the particles of kaolin is less than or equal to 4 μm, and
   a content ratio of the kaolin ranges from 100 parts by mass to 150 parts by mass, inclusive, with respect to 100 parts by mass of the polymer component.

2. The electrolytic capacitor according to claim 1, wherein the average particle size of the particles of kaolin is greater than or equal to 1.5 μm.

3. The electrolytic capacitor according to claim 1, wherein the kaolin is calcined kaolin.

4. The electrolytic capacitor according to claim 1, wherein a proportion of the butyl rubber in the elastic member ranges from 20% by mass to 60% by mass.

5. The electrolytic capacitor according to claim 1, wherein the particle component further contains particles of talc.

6. The electrolytic capacitor according to claim 5, wherein a proportion of the talc in a total amount of the kaolin and the talc is less than or equal to 30% by mass.

7. The electrolytic capacitor according to claim 5, wherein a proportion of the talc in a total amount of the kaolin and the talc is less than or equal to 10% by mass.

8. The electrolytic capacitor according to claim 1, wherein a proportion of the kaolin is the highest in the particle component.

9. The electrolytic capacitor according to claim 1, wherein:
   the elastic member further includes an antioxidant, and
   a content ratio of the antioxidant ranges from 0.5 parts by mass to 6.0 parts by mass, inclusive, with respect to 100 parts by mass of the polymer component.

10. The electrolytic capacitor according to claim 9, wherein the antioxidant includes a hindered phenol compound.

11. The electrolytic capacitor according to claim 1, wherein the capacitor element includes a solid electrolyte containing a conductive polymer.

12. An electrolytic capacitor comprising:
a capacitor element;
a case that houses the capacitor element, the case having an opening; and
a sealing member that seals the opening, wherein:
the sealing member includes an elastic member that is fit in the opening,
the elastic member includes a polymer component and a particle component,
the polymer component contains at least butyl rubber,
the particle component includes at least particles of kaolin,
an average particle size of the particles of kaolin is less than or equal to 4 μm,
a content ratio of the kaolin ranges from 70 parts by mass to 150 parts by mass, inclusive, with respect to 100 parts by mass of the polymer component,
the particle component further contains particles of talc, and
a proportion of the talc in a total amount of the kaolin and the talc is less than or equal to 10% by mass.

13. The electrolytic capacitor according to claim 12, wherein the average particle size of the particles of kaolin is greater than or equal to 1.5 μm.

14. The electrolytic capacitor according to claim 12, wherein the kaolin is calcined kaolin.

15. The electrolytic capacitor according to claim 12, wherein a proportion of the butyl rubber in the elastic member ranges from 20% by mass to 60% by mass.

16. The electrolytic capacitor according to claim 12, wherein a proportion of the talc in a total amount of the kaolin and the talc is less than or equal to 30% by mass.

17. The electrolytic capacitor according to claim 12, wherein a proportion of the kaolin is the highest in the particle component.

18. The electrolytic capacitor according to claim 12, wherein:
the elastic member further includes an antioxidant, and
a content ratio of the antioxidant ranges from 0.5 parts by mass to 6.0 parts by mass, inclusive, with respect to 100 parts by mass of the polymer component.

19. The electrolytic capacitor according to claim 12, wherein the antioxidant includes a hindered phenol compound.

20. The electrolytic capacitor according to claim 12, wherein the capacitor element includes a solid electrolyte containing a conductive polymer.

* * * * *